Dec. 31, 1940.    J. B. ENTZ    2,227,129
HEAT ENGINE
Filed Oct. 28, 1939    2 Sheets-Sheet 1
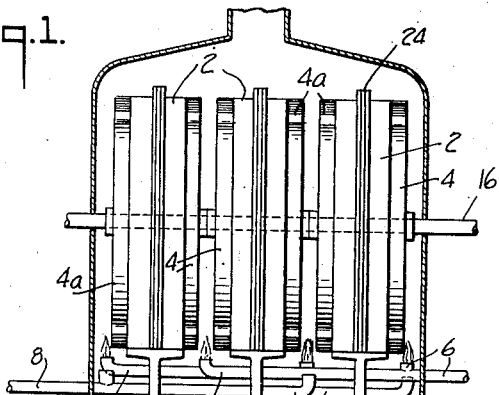
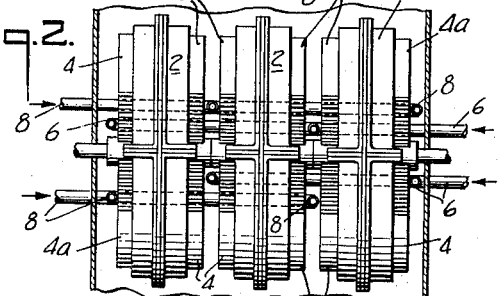
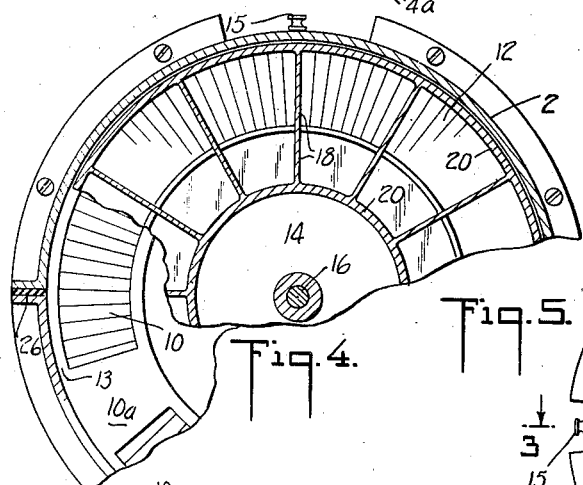
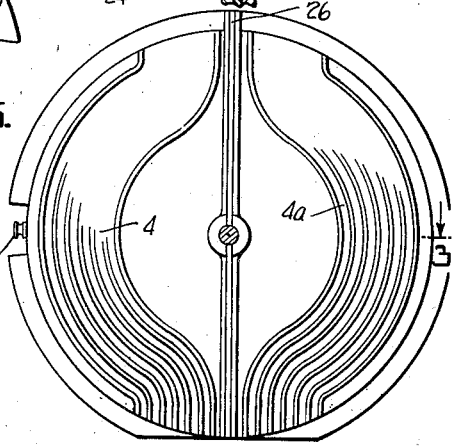
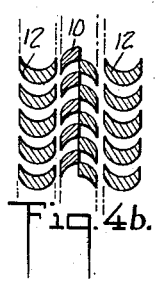
INVENTOR.
JUSTUS B. ENTZ
BY Bartlett, Eyre, Scott & Keel
ATTORNEYS

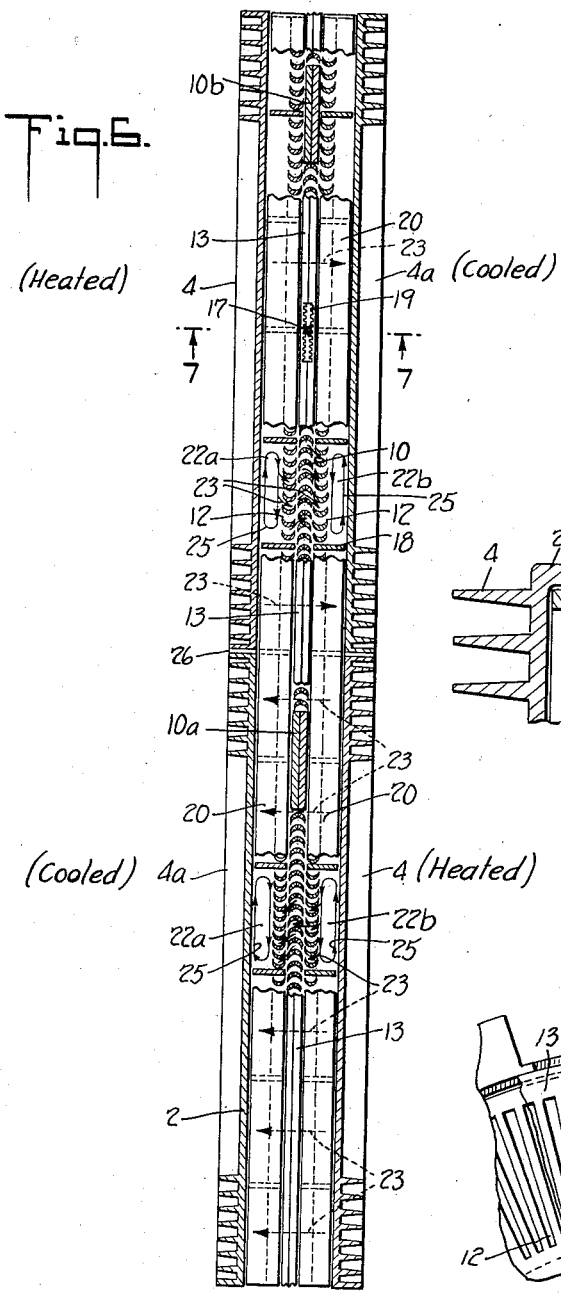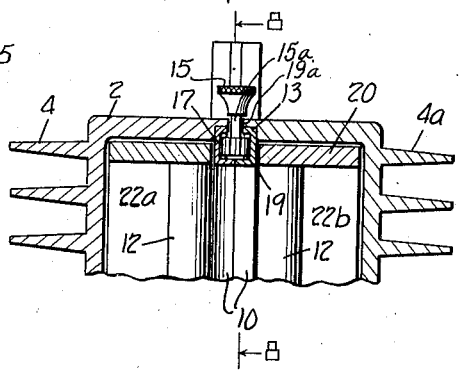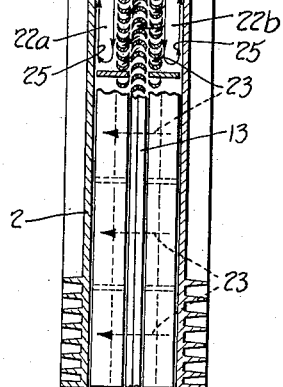

Patented Dec. 31, 1940

2,227,129

UNITED STATES PATENT OFFICE 2,227,129

HEAT ENGINE

Justus B. Entz, New Rochelle, N. Y.

Application October 28, 1939, Serial No. 301,774

10 Claims. (Cl. 60—24)

The present invention relates to heat engines of the type employing air or other fluid as the operating medium and comprises a novel engine of this type which is efficient and yet simple of construction. Unlike hot air engines heretofore devised the new engine employs no reciprocating prime mover and requires no transference of heated air from the point of heating to the point of use. The new engine may be constructed to deliver substantial power, is economical both to construct and to use. It has a minimum of moving parts, requires substantially no lubrication and is silent in operation.

Briefly the new engine comprises one or more fixed containers each having fixed radially reentrant turbine blades and a wheel-like member within each container having radial turbine blades cooperating with the fixed blades and having vanes which together with the walls of the container provide a plurality of pockets or chambers for the air within the container. Temperature differences are maintained across each container causing air to flow from heated pockets to cooler pockets. These currents flowing through the turbine blades in opposite direction provide the motive power for the wheel-like member.

For a better understanding of the invention reference may be had to the accompanying drawings of which:

Fig. 1 is a side view of the new heat engine showing three units connected together;

Fig. 2 is a plan view of the engine of Fig. 1;

Fig. 3 is a horizontal sectional view through one of the units of Figs. 1 and 2 taken on the line 3—3 of Fig. 5;

Fig. 4 is a sectional view along the line 4—4 of Fig. 3 with parts broken away to show the fixed blades;

Fig. 4a is a circular sectional view through the turbine blades taken along the radius 4a—4a of Fig. 3;

Fig. 4b is a view similar to Fig. 4a but showing the fixed blades in closed position;

Fig. 5 is a side view of one of the units showing the outside wall construction;

Fig. 6 is a development corresponding to a section taken along the radius 6—6 of Fig. 3 with parts broken away and with arrows indicating the direction of fluid flow;

Fig. 7 is an enlarged sectional view taken along the line 7—7 of Fig. 6; and

Fig. 8 is an enlarged sectional view taken along the line 8—8 of Fig. 7.

Each unit of the three-element heat engine shown in Figs. 1 and 2 includes a fixed cylindrical casing 2 provided with fins 4 and 4a on its external surfaces. These fins 4 and 4a, as shown in Fig. 5, extend vertically from the lower part of the casing, then circularly along the central part and again vertically at the upper part of the casing to afford directing channels for heating and cooling streams. Fins 4 are continuously heated and fins 4a are continuously cooled. For example, in the embodiment of the invention illustrated, fins 4 of each casing 2 are heated by gas burners 6 and fins 4a are cooled by air issuing from a duct 8; the heating and cooling being arranged, as shown best in Figs. 2, 3 and 6, so that opposite areas of each casing 2, and also opposite halves of each side of each casing are at different temperatures. The purpose of this arrangement will be explained in connection with the later description of the moving element of each unit of the engine.

Each casing 2 carries a series of radially reentrant turbine blades 10 which are split along their length. At two positions about the periphery of the casing, blades 10 are omitted and imperforate sections 10a and 10b substituted therefor. The sections 10a and 10b and blades 10 are all carried on a split ring 13 the halves of which can be rotated together relatively to the casing to shift the position of the sections 10a and 10b and can be separately rotated relatively to each other to vary the cross sectional area of the fluid passages through the blades. Suitable means for effecting this control comprises a knob 15 mounted on a rod 15a which carries a sprocket 17 cooperating with ratchets 19 on the ring 13. Turning of knob 15 thus shifts the halves of blades 10 and the halves of sections 10a and 10b relatively to each other and movement of the knob 15 circumferentially in a slot 19a (see Figs. 7 and 8) moves the split ring as a whole to shift the location of sections 10a and 10b.

The annulus comprising the blades 10 and imperforate sections 10a and 10b is positioned between two sets of moving blades 12, the curvature of which is opposite to that of blades 10. Blades 12 are carried by a wheel-like member 14 which is rigidly mounted on the shaft 16 to be driven. Member 14 is provided on each side with a plurality of radial vanes 18 and a pair of circular vanes 20 which together with the walls of casing 2 define a plurality of pairs of pockets or chambers 22a and 22b. The chambers 22a and 22b of each pair are in communication through the passages of the blades 10 and 12. Air or other operating fluid, preferably under pressure is supplied to the chambers 22a and 22b in any suitable manner. For example, it may be admitted through the casing wall at any point while the shaft is rotated to bring each chamber in turn into position to receive the fluid.

From the above description and from the prior description of the heating and cooling arrangement of fins 4 and 4a, it will be noted that the fluid in one chamber of each pair is always subjected to a different temperature than is the fluid in the other chamber of that pair. Thus in the position of member 14 shown in Figs. 3 and 6 fluid in chamber 22a in the upper half of each figure will be heated by the heated stream flowing between fins 4 while fluid in chamber 22b of that pair is cooled by the cooling stream flowing along fins 4a. The reverse effect is obtained at the lower half of Figs. 3 and 6, fluid in chamber 22a being cooled and that in chamber 22b being heated. If blades 10 are closed, pressure will then build up in one chamber of each pair and decrease in the other chamber of each pair. Opening of blades 10 permits flow of fluid between the chambers to equalize the pressures, which flow, irrespective of the direction, gives like rotative thrusts upon the turbine blades 12 tending to rotate member 14 and shaft 16. With rotation of member 14, chambers to which fluid has been flowing, that is ones in which the fluid was cooled, pass into the heated zone and conversely those chambers in which the fluid has been heated pass into the cooled zone. Reversal of the fluid flow then takes place with continued thrust upon the blades. Thus there will be a continual flow of fluid back and forth between each pair of chambers; fluid flowing in one direction between some pairs of chambers and simultaneously in the opposite direction between other pairs of chambers; member 14 always rotating in one direction. The rate of rotation of member 14 may be controlled by turning knob 15 to vary the turbine passages.

The direction of the flow of fluid between the chambers of each pair is indicated by arrows 23 in Fig. 6. During operation there will also be a circulation of the fluid within each chamber because of the relative movement of the walls of the chamber occurring during rotation of member 14. This circulation within each chamber, indicated by arrows 25 in Fig. 6 insures that the fluid will rapidly assume the temperature of the adjacent casing wall. During operation of the engine the pressure in one chamber of each pair gradually drops to a minimum while simultaneously the pressure in the companion chamber of that pair is building up from the minimum to the maximum. At some time, therefore, the pressures in the two chambers of each pair will be equal, and this equalization of pressure will occur shortly after the chambers pass from a heated zone to a cooled zone and vice versa. The solid sections 10a and 10b are located as shown in Fig. 6 at substantially the positions where such equalization of pressure will occur. They insure a more rapid building up of pressure in the newly heated chambers and a more rapid cooling and consequent reduction in pressure of the fluid in the newly cooled chambers. As the exact position at which pressure equalization occurs will vary with the speed, the position of the sections 10a and 10b is made adjustable as heretofore indicated.

Preferably the heated and cooled areas of the casings are insulated from each other. For example, as indicated in Figs. 2 and 5, each casing is made of four sections, two on each side. The two sides are separated by an insulating ring 24 and the two halves of each side by an insulating strip 26.

In the particular embodiment of the invention illustrated each fluid chamber is connected through the turbine passage with but one other chamber, that opposite thereto, and hence the chambers have been described as arranged in pairs. Such arrangement is not, of course, necessary, as the engine depends for its operation only upon the flow of fluid back and forth through the blades from one side of the rotating member to the other. Hence if the radial vanes on one side were not aligned with those on the other side, the operation would be the same although the chambers would not be strictly in pairs. It is only essential that fluid in chambers on one side of the rotating member can flow through the blades to chambers on the other side of the member and that heated and cooled zones be so distributed that fluid in opposite chambers is always subjected to different temperatures and, during rotation, undergoes opposite temperature cycles.

The invention has now been described in connection with one embodiment thereof. The particular engine illustrated comprises a battery of three units in each of which the rotating member carries twelve pairs of chambers and in each of which one set of fixed turbine blades is positioned between sets of rotating blades. Obviously, the number of units employed as well as the number of chambers of each unit and the number of sets of fixed and movable turbine blades of each could be varied according to the space available for occupancy, power to be generated and the desired initial cost of construction. Also the number of heated and cooled zones of each unit could be varied as desired. Various other changes in design or construction could be made and various auxiliary means added without departing from the spirit of the invention. For example, in most, if not all, cases it is advisable to provide some suitable auxiliary means for starting rotation of the shaft. Such means have not been illustrated as forming no part of the present invention and as being well known in the art.

From the foregoing description it will be apparent that the invention comprises an engine in each unit of which there is but one moving part—the member 14—which rotates and requires no wasteful reciprocatory motion. It will also be apparent that the new engine utilizes the heated fluid substantially at the point of heating and also that no extended areas have to be alternately heated and cooled; heating and cooling being effected over fixed areas. The engine is characterized by extreme quietness and efficiency.

I claim:

1. In a heat engine, a plurality of fixed areas maintained at different temperatures, a rotatable member carrying a plurality of chambers having fluid therein in contact with said areas, the chambers in contact with a fixed area of one temperature being oppositely disposed to chambers in contact with the fixed area of another temperature and turbine passages connecting opposite chambers for passage of fluid therethrough for rotation of said member, said fixed areas being so distributed as to successively expose the fluid in each chamber to different temperatures upon rotation of said member.

2. The combination according to claim 1 including means for varying the cross sectional area of said turbine passages whereby the speed of rotation of said member may be controlled.

3. In a heat engine, a fixed casing, a rotatable member therein provided with a plurality of oppositely disposed pockets for fluid, the fluid in said pockets being in contact with the side walls of said casing, said rotatable member and casing carrying cooperating turbine blades providing fluid passages between oppositely disposed pockets, means for maintaining opposite sections of the side walls of said casing at different temperatures and adjacent sections of each side wall of said casing at different temperatures whereby fluid passes back and forth through said passages to rotate said member and fluid in opposite pockets is always subjected to different temperatures and undergoes opposite temperature cycles during rotation of said member.

4. In a heat engine the combination comprising a shaft to be driven, a driving member therefor mounted on said shaft and carrying sets of spaced turbine blades, a fixed casing enclosing said member and provided with reentrant turbine blades positioned between the sets of said first mentioned blades, said casing having fixed areas maintained at different temperatures, said driving member carrying oppositely disposed chambers for fluid interconnected through said blades, whereby when the fluid in opposite chambers is subjected to a difference in temperature by contact with said fixed areas the flow of fluid through said blades gives a rotative thrust to said driving member.

5. The combination according to claim 4 wherein said reentrant turbine blades include a movable section and wherein means are provided for moving said section to vary the size of the passages through the blades.

6. In a heat engine, the combination comprising a cylindrical fixed casing, a reentrant annulus carried thereby, a rotatable wheel-like member within said casing having oppositely disposed vanes and carrying sets of turbine blades positioned at either side of said annulus, the side walls of said casing, said blades and said vanes defining a plurality of chambers for fluid, segments of said annulus being imperforate and the rest of said annulus being composed of radial turbine blades, and means for maintaining fixed areas of each side of said casing and opposite areas of said sides at different temperatures, whereby flow of fluid back and forth from one chamber to another chamber through the turbine blades rotates said wheel-like member, said imperforate segments of said annulus being so located that opposite chambers after entering a zone of different temperature pass one of said segments whereby fluid flow between such chambers is temporarily prevented.

7. The combination according to claim 6 including means for rotating said annulus relative to said casing to shift the location of said imperforate sections.

8. The combination according to claim 6 wherein said annulus, including said turbine blades and imperforate segments, is divided in two halves and means are provided for shifting one half of said annulus relative to the other half to control the cross-sectional area of said turbine passages and to thereby control the speed of rotation of said wheel-like member.

9. In a heat engine, a shaft to be driven, a plurality of driving members secured to said shaft, fixed casings enclosing said driving members and provided with radially reentrant turbine blades, sets of turbine blades carried by each driving member for cooperation with said fixed blades, vanes on said driving members which together with said casing provide oppositely disposed chambers for fluid interconnected through the passages of the cooperating blades and means for maintaining a temperature difference across opposite chambers and for successively increasing and decreasing the temperature of fluid in each chamber upon rotation of said shaft, the passages of said cooperating blades being so formed that fluid flow therethrough in either direction causes unidirectional rotation of the driving member.

10. The heat engine according to claim 9 wherein said casings are substantially cylindrical and one half the external surface of each side of each casing is heated by said last mentioned means, the heated half of each side being opposite to the unheated half of the other side of the same casing and adjacent to the heated half of the side of the neighboring casing.

JUSTUS B. ENTZ.